United States Patent
Kuroda et al.

(10) Patent No.: US 6,941,211 B1
(45) Date of Patent: Sep. 6, 2005

(54) MEASUREMENT CONTROLLER FOR VEHICLE

(75) Inventors: Hiroshi Kuroda, Tokyo (JP); Hiroshi Takenaga, Tokyo (JP); Hiroto Morizane, Tokyo (JP); Shiho Izumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 10/239,151

(22) PCT Filed: Aug. 17, 2000

(86) PCT No.: PCT/JP00/05506

§ 371 (c)(1),
(2), (4) Date: Sep. 20, 2002

(87) PCT Pub. No.: WO02/15152

PCT Pub. Date: Feb. 21, 2002

(51) Int. Cl.[7] .................................................. G06G 7/78
(52) U.S. Cl. ........................... 701/70; 701/223; 342/46; 342/52
(58) Field of Search .............................. 701/70, 78, 79, 701/93, 96, 301; 342/46; 340/425.5, 435, 436

(56) References Cited

U.S. PATENT DOCUMENTS

| | | | | |
|---|---|---|---|---|
| 4,272,800 A | * | 6/1981 | Asatourian | 362/489 |
| 4,641,136 A | | 2/1987 | Kowalczyk | 340/903 |
| 6,289,278 B1 | * | 9/2001 | Endo et al. | 701/208 |

FOREIGN PATENT DOCUMENTS

| | | |
|---|---|---|
| JP | 6231398 | 8/1994 |
| JP | 8122432 | 5/1996 |
| JP | 8261753 | 10/1996 |
| JP | 9243326 | 9/1997 |
| JP | 10160835 | 6/1998 |
| JP | 1123291 | 1/1999 |
| JP | 11321379 | 11/1999 |

* cited by examiner

Primary Examiner—Yonel Beaulieu
(74) Attorney, Agent, or Firm—Crowell & Moring LLP

(57) ABSTRACT

A measuring and controlling apparatus for a vehicle includes an image processing device, which is mounted on a vehicle, photographs a circumferential state of the vehicle and processes the image signal; a radar signal processing device, which radiates radio wave or light to process a receiving signal; and a control device for controlling a brake, a throttle valve or a transmission based on the output results of the image processing device and the radar signal processing device. In such a measuring and controlling apparatus for a vehicle, the respective output information of the image processing device and the radar signal processing device includes time information at the time of photographing and time information at the time of measuring and the order of the photographed time and the measured time are adjusted. Thus, even if the processing time differs between the cases where a subject to be photographed is simple and complicated, since the photographed time and the measured time can be identified, the suitable processing according to the processing time can be executed. Thus, the running state of the vehicle can be controlled with high accuracy.

15 Claims, 9 Drawing Sheets

EXAMPLE OF OUTPUT DATA FORMAT

| DISTANCE TO VEHICLE AHEAD | MEASUREMENT TIME |
|---|---|

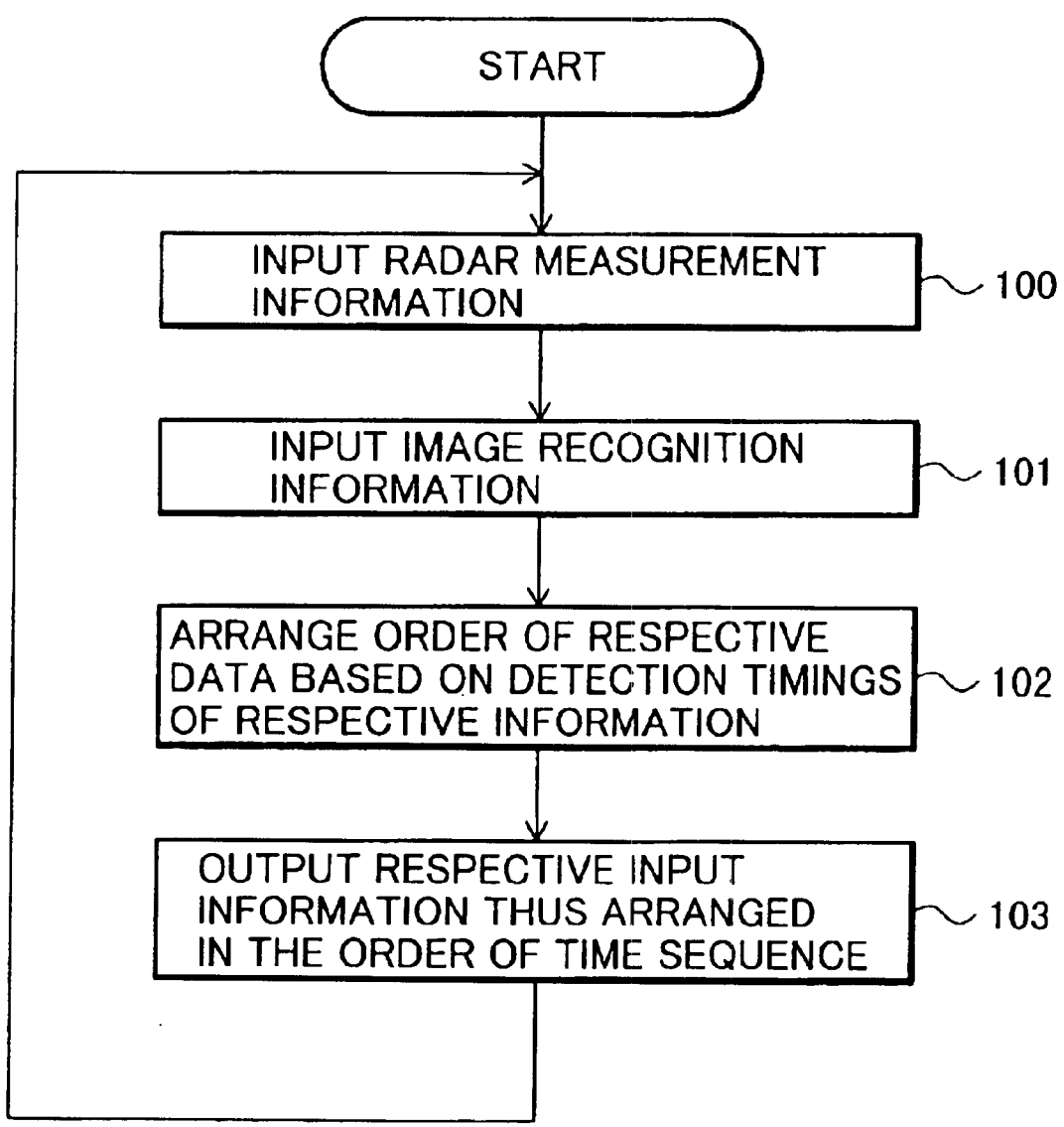

MEASUREMENT CONTROLLER FOR VEHICLE

TECHNICAL FIELD

The present invention relates to a measuring and controlling apparatus for a vehicle which measures a circumferential state of an automobile and controls the running of the automobile based on the measured result.

BACKGROUND OF THE INVENTION

Conventionally, some of measuring and controlling apparatuses for vehicles employ a method of radiating radio wave or light and measuring a distance to a target such as an automobile or obstacle ahead of the automobile and a relative speed with respect to the target.

As a radar apparatus utilizing radio wave, various kinds of millimeter wave radars are described in "Trend of Development of Millimeter Wave Radar for Vehicle", The Journal of the institute of Electronics. Information and Communication Engineers, 1996, October, pp. 977–981, for example.

An example of radar apparatuses utilizing light is described in JP-A-8-261753.

Further, such a technique is proposed that a camera is mounted on a vehicle, then the camera photographs or picks up an image of a vehicle ahead, and the image thus image picked-up or photographed is subjected to an image recognition processing thereby to recognize the vehicle ahead.

A method in which a vehicle trying to cut in is detected in advance by using both the radar apparatus utilizing light or radio wave and the image processing apparatus utilizing a camera is described in JP-A-11-321379. A method of improving recognition efficiency of a vehicle ahead is described in JP-A-6-231398 etc.

JP-A-10-160835 describes a technique in which a camera and a scanning type laser radar are used in a manner that a beam of the laser radar is scanned in synchronism with the synchronizing signal of the camera, whereby even if plural vehicles ahead are photographed in an overlapped manner, distances to subjects within an image photographed by the camera are grasped on a pixel unit basis and an overlapped state of the plural vehicles ahead are recognized.

DISCLOSURE OF THE INVENTION

However, in the conventional technique, in the case of controlling the operation of a vehicle by utilizing output signals from the millimeter wave radar apparatus or the light radar apparatus (hereinafter abbreviated as a radar apparatus) and the image processing apparatus, it has not been taken into consideration that time lengths required for signal processings in the radar apparatus and the image processing apparatus differ depending on scenes.

A time length required for signal processing in each of the radar apparatus and the image processing apparatus becomes a delay time until the result of the signal processing is outputted after the signal is inputted into the apparatus. This processing time largely differs depending on an environment condition of the road.

For example, in the case of recognizing a vehicle ahead by the image processing apparatus, since the degree of complication of a scene differs at every scene (frame), a time period required for the image processing for recognizing a vehicle ahead differs at every scene.

As a result, a time difference between a time point where the radar apparatus or the image processing apparatus measures or photographs and a time point where the processing results of these apparatuses are sent to the apparatus for controlling the operation of a vehicle differs at every scene (frame). Thus, there arises a problem that this time difference appears as a control error in the vehicle control since such a time difference has not been taken into consideration.

Further, in the case of controlling the operation of a vehicle by using both the output signals of the radar apparatus and the image processing apparatus, it has not been taken into consideration that a time period required for the signal processing of the radar apparatus and a time period required for the signal processing of the signal processing apparatus differs depending on scenes.

As a result, an order relation among a time point where the radar apparatus measures, a time point where the image processing apparatus photographs and a time point where the processing results of these apparatuses are sent to the apparatus for controlling the operation of the vehicle differs at every scene (frame). Thus, there arises a problem that such time difference among these time points appears as a control error in the vehicle control.

Accordingly, an object of the present invention is, in a measuring and controlling apparatus for a vehicle which performs a sensing operation by a radar apparatus or an image processing apparatus and controls the vehicle by using the sensing result, to realize the measuring and controlling apparatus for a vehicle which can control the vehicle at a high accuracy by taking into consideration of a variation of a time difference between a time point where the radar apparatus or the image processing apparatus measures or photographs and a time point where the signals from these apparatuses are processed.

In order to attain the aforesaid object, the present invention is configured as follows.

(1) A measuring and controlling apparatus for a vehicle includes: an image pick-up means which is mounted on the vehicle and photographs a circumferential state of the vehicle; a first processing means for processing a signal from the image pick-up means; a radar measuring means which radiates radio wave or light to measure a distance to a subject at periphery of the vehicle; a second processing means for processing a signal from the radar measuring means; and a control means for controlling at least one of a brake, a throttle valve and a transmission based on an output of the first processing means and an output of the second processing means, wherein each of output information of the first processing means and output information of the second processing means includes time information.

(2) Preferably, in the aforesaid arrangement (1), there is further provided with a means for adjusting time order of the respective output information from the time information contained in the output information of the first processing means and the time information contained in the output information of the second processing means (3) Preferably, in the aforesaid arrangement (1) or (2), common time information is added to the output information of the image pick-up means and the output information of the radar measuring means.

(4) A measuring and controlling apparatus for a vehicle includes: an image pick-up means which is mounted on the vehicle and photographs a circumferential state of the vehicle; and a processing means for processing a signal from the image pick-up means, wherein output information of the processing means(2) includes time information relating to the image pick-up means.

(5) Preferably, in the aforesaid arrangement (4), the time information is information relating to a time point where the image pick-up means takes an image therein.

(6) A measuring and controlling apparatus for a vehicle includes: an image pick-up means which is mounted on the vehicle and photographs a circumferential state of the vehicle; and a processing means for processing a signal from the image pick-up means, wherein output information of the processing means includes information relating to a delay time from a time point where the image pick-up means takes an image therein to a time point where the processing means outputs data.

(7) A measuring and controlling apparatus for a vehicle includes: a radar measuring means which radiates radio wave or light to measure a distance to a subject at periphery of the vehicle; and a processing means for processing a signal from the radar measuring means, wherein output information of the processing means includes time information relating to the radar measuring means.

(8) Preferably, in the aforesaid arrangement (7), the time information is information relating to a time point where the radar measuring means takes receiving data therein.

(9) A measuring and controlling apparatus for a vehicle includes: a radar measuring means which radiates radio wave or light to measure a distance to a subject at periphery of the vehicle; and a processing means for processing a signal from the radar measuring means, wherein output information of the processing means includes information relating to a delay time from a time point where the radar measuring means takes receiving data therein to a time point where the processing means outputs data.

(10) An automobile is characterized by including a measuring and controlling apparatus for a vehicle includes: an image pick-up means which is mounted on the vehicle and photographs a circumferential state of the vehicle; and a processing means for processing a signal from the image pick-up means, wherein output information of the processing means(2) includes time information relating to the image pick-up means.

(11) An automobile is characterized by including a measuring and controlling apparatus for a vehicle includes: an image pick-up means which is mounted on the vehicle and photographs a circumferential state of the vehicle; and a processing means for processing a signal from the image pick-up means, wherein output information of the processing means includes information relating to a delay time from a time point where the image pick-up means takes an image therein to a time point where the processing means outputs data.

(12) A recording medium for recording therein control program for a measuring and controlling apparatus for a vehicle, includes: a first processing for processing a signal from an image pick-up means which is mounted on the vehicle and photographs a circumferential state of the vehicle: a second processing for processing a signal from a radar measuring means which radiates radio wave or light to measure a distance to a subject at periphery of the vehicle; a time information adding processing for adding respective time information to output information of the first processing and output information of the second processing, respectively; a time adjusting processing for adjusting time order of the respective output information based on the time information contained in the output information of the first processing and the time information contained in the output information of the second processing; and a control processing for controlling at least one of a brake, a throttle valve and a transmission based on the output of the first processing and the output of the second processing subjected to the time adjusting processing.

BRIEF DESCRIPTION OF THE DRAWINGS

FIG. 10 is a diagram showing a processing flowchart of a sensor input data processing unit.

BEST MODE FOR CARRYING OUT THE INVENTION

Hereinafter, an embodiment of the present invention will be explained with reference to FIGS. 1 to 9.

Figure 1:
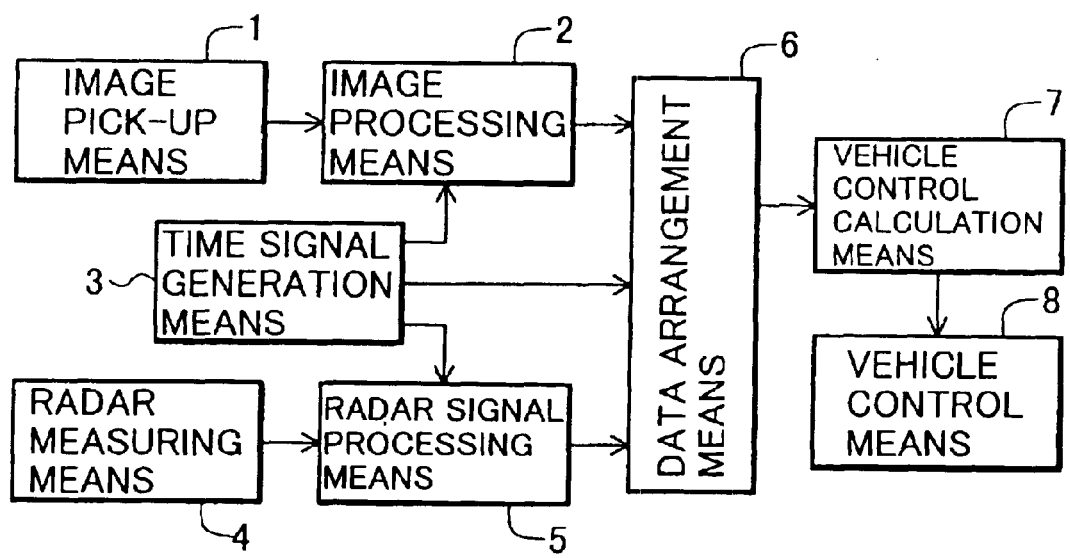
FIG. 1 is a diagram showing the system of a measuring and controlling apparatus for a vehicle.

FIG. 1 is a system diagram of a measuring and controlling apparatus for a vehicle according to the embodiment of the present invention. The measuring and controlling apparatus for a vehicle includes an image pick-up means 1, an image processing means 2, a time signal generation means 3, a radar measuring means 4, a radar signal processing means 5, a data arrangement means 6, a vehicle control calculation means 7 and a vehicle control means An example of operations of these respective means 1 to 8 will be explained with reference to a timing chart shown in FIG. 2.

Figure 2:
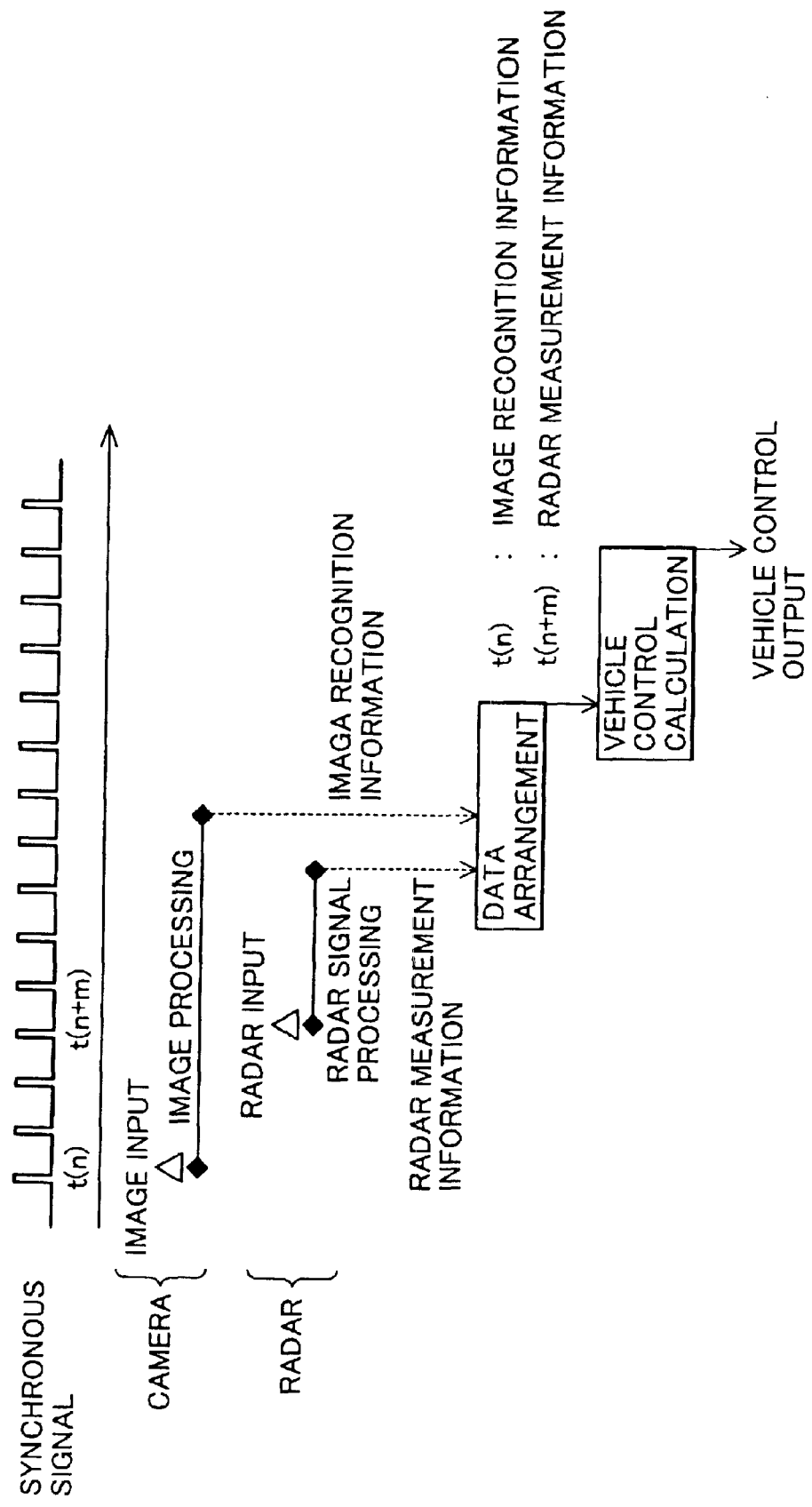
FIG. 2 is a diagram showing an example of input timings of a radar and a camera.

In FIG. 2, the image pick-up means (camera) 1 photographs or picks up an image of a status ahead of an own vehicle and sends information thus photographed to the image processing means 2. The image processing means 2 records an image input timing at which the mage is photographed in the form of a time signal from the time signal generation means 3. In the example shown in FIG. 2, t(n) corresponds to the image input timing.

The image processing means 2 executes a processing of recognizing a target recognition subject from the image information sent from the image pick-up means 1. After the completion of the recognition processing, the image processing means 2 outputs the recognition result to the data arrangement means 6.

The radar measuring means 4 transmits and receives radio wave or light, and the radar signal processing means 5 processes transmission and receiving signals to calculate a distance between the own vehicle and a vehicle ahead and a relative speed. In this case, like the image processing means 2, the radar signal processing means 5 records a signal input timing at which the measurement is performed by the radar measuring means 4 in the form of the time signal from the time signal generation means 3. In the example shown in FIG. 2, t(n+m) corresponds to the radar input timing.

The information of the distance and the relative speed calculated by the radar signal processing means 5 is outputted to the data arrangement means 6 after the completion of the radar signal processing.

In the example of FIG. 2, the image input timing t(n) at the camera 1 is earlier than the input timing t(n+m) at the radar 4.

However, since a time period required for processing the signal from the camera 1 differs from a time period required for processing the signal from the radar 4, there arises a case that a time point where the image recognition information is sent from the image processing means 2 to the data arrangement means 6 is later than a time point where the radar measurement information is sent to the data arrangement means.

Thus, the data arrangement means 6 compares the time information t(n) sent in accompany with the camera information with the time information t(n+m) sent in accompany with the radar information, then changes the order of the camera information and the radar information in the originally measured order, and outputs the radar measurement information and the image recognition information to the vehicle control calculation means 7 in the order thus changed.

The vehicle control calculation means 7 inputs the radar measurement information and the image recognition information together with their time information accompanied therewith, then performs calculation for the vehicle control and outputs an instruction for the vehicle control to the vehicle control means 8.

As described above, the embodiment of the present invention is configured in a manner that the information measured by the radar and the information photographed by the camera are arranged in the order of the respective time point information of the measured and photographed timings thereby to perform the vehicle control.

Accordingly, in the measuring and controlling apparatus for a vehicle which performs the sensing operation by the radar apparatus and the image processing apparatus and controls the vehicle by using the sensing results, it is possible to realize the measuring and controlling apparatus for a vehicle which can control the vehicle at high accuracy by taking into consideration of a variation of a time difference between the time points where the radar apparatus and the image processing apparatus measures and photographs and the time point where the signals from these apparatuses are processed.

Next, another embodiment of the present invention will be explained as an example of a system for controlling a distance between own vehicle and a vehicle ahead which uses the radar apparatus and the image pick-up apparatus.

Figure 3:
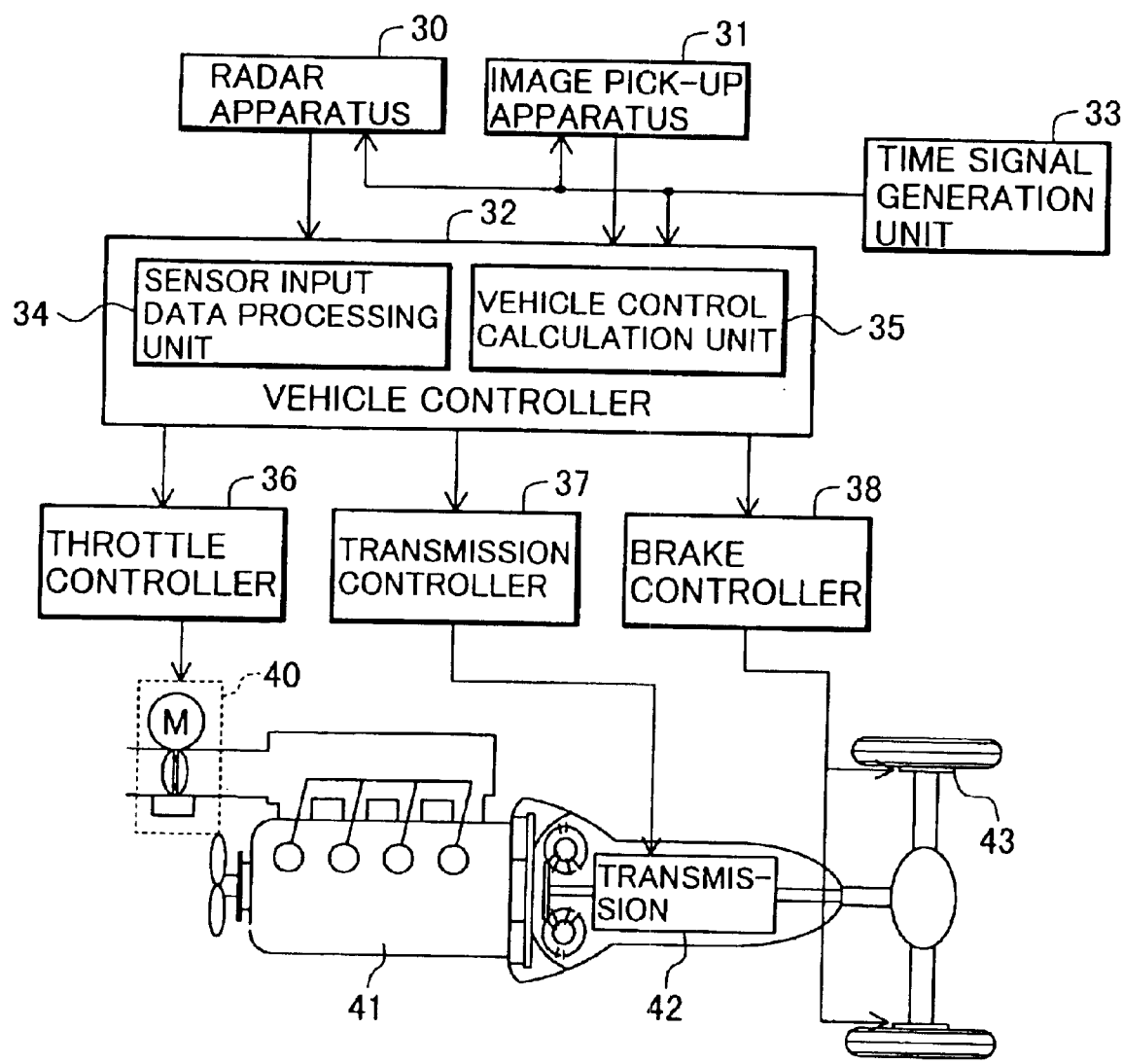
FIG. 3 is a block diagram showing the configuration of the measuring and controlling apparatus for a vehicle.

FIG. 3 is a block diagram showing the system for controlling a distance to a vehicle ahead according to another embodiment of the present invention.

In FIG. 3, an image pick-up apparatus 31 photographs or picks up an image of a state ahead of the own vehicle, then subjects a target subject thus photographed to an image processing and outputs the image thus processed. The image pick-up apparatus executes both the function of the image pick-up means 1 and the function of the image processing means 2 in FIG. 1. When the image pick-up apparatus 31 photographs an image, the image pick-up apparatus records a time point where the image has been photographed based on the time signal from a time signal generation unit 33.

Then, the image pick-up apparatus 31 performs a processing of recognizing a target recognition subject from the image information, and outputs the image recognition information as the result of the recognition and the time information to a vehicle controller 32 after the completion of the recognition processing.

A radar apparatus 30 transmits and receives radio wage or light to calculate a distance to a vehicle ahead and a relative speed with respect to the vehicle ahead. That is, the radar apparatus 30 executes both the function of the radar measuring means 4 and the function of the radar signal processing means 5 in FIG. 1.

Then, like the image pick-up apparatus 31, the radar apparatus 30 records a time point where the subject has been measured by the radar based on the time signal from the time signal generation unit 33. The radar apparatus 30 outputs the information of the distance between the own vehicle and a vehicle ahead and the relative speed as the radar measurement information and the time information to the vehicle controller 32 after the completion of the radar measurement processing.

The vehicle controller 32 has a function of calculating and outputting an instruction for controlling a speed of the vehicle based on the data of the distance to a vehicle ahead and the relative speed sent from the radar apparatus 30 and the image pick-up apparatus 31 and the respective time information.

A sensor input data processing unit 34 within the vehicle controller 32 executes the function of the data arrangement means 6 in FIG. 1 and so executes a processing of reading the time information accompanied to the respective data sent from the radar apparatus 30 and the image pick-up apparatus 31 and arranging the respective data in the order of the respective time information.

The respective information arranged in the order of the respective time information is sent to a vehicle control calculation unit 35. The vehicle control calculation unit 35 executes the function of the vehicle control calculation means 7 in FIG. 1 in a manner that an instruction for controlling a throttle valve, a transmission and a brake is outputted to a throttle valve controller 36, a transmission controller 37 and a brake controller 38 based on the sensing information inputted from the sensor input data processing unit 34 and speed information of the own vehicle etc. so that a speed of the own vehicle becomes a predetermined speed.

The throttle valve controller 36 controls a throttle valve actuator 40 for operating the throttle valve of an internal combustion engine 41 based on an instruction from the vehicle controller 37. The transmission controller 37 controls a transmission 42 based on an instruction from the vehicle controller 37. The brake controller 38 controls a brake actuator 43.

The throttle valve controller 36, the transmission controller 37 and the brake controller 38 execute the function of the vehicle control means 8 in FIG. 1.

In this manner, since the input signals from the respective sensors (the radar apparatus 30 and the image pick-up apparatus 31) are arranged in the order of the sensing timings thereof and then used for the vehicle control, the vehicle control with a high accuracy can be realized.

Next, the configuration of an example of the radar apparatus 20 will be explained with reference to FIGS. 4 and 5.

Figure 4:
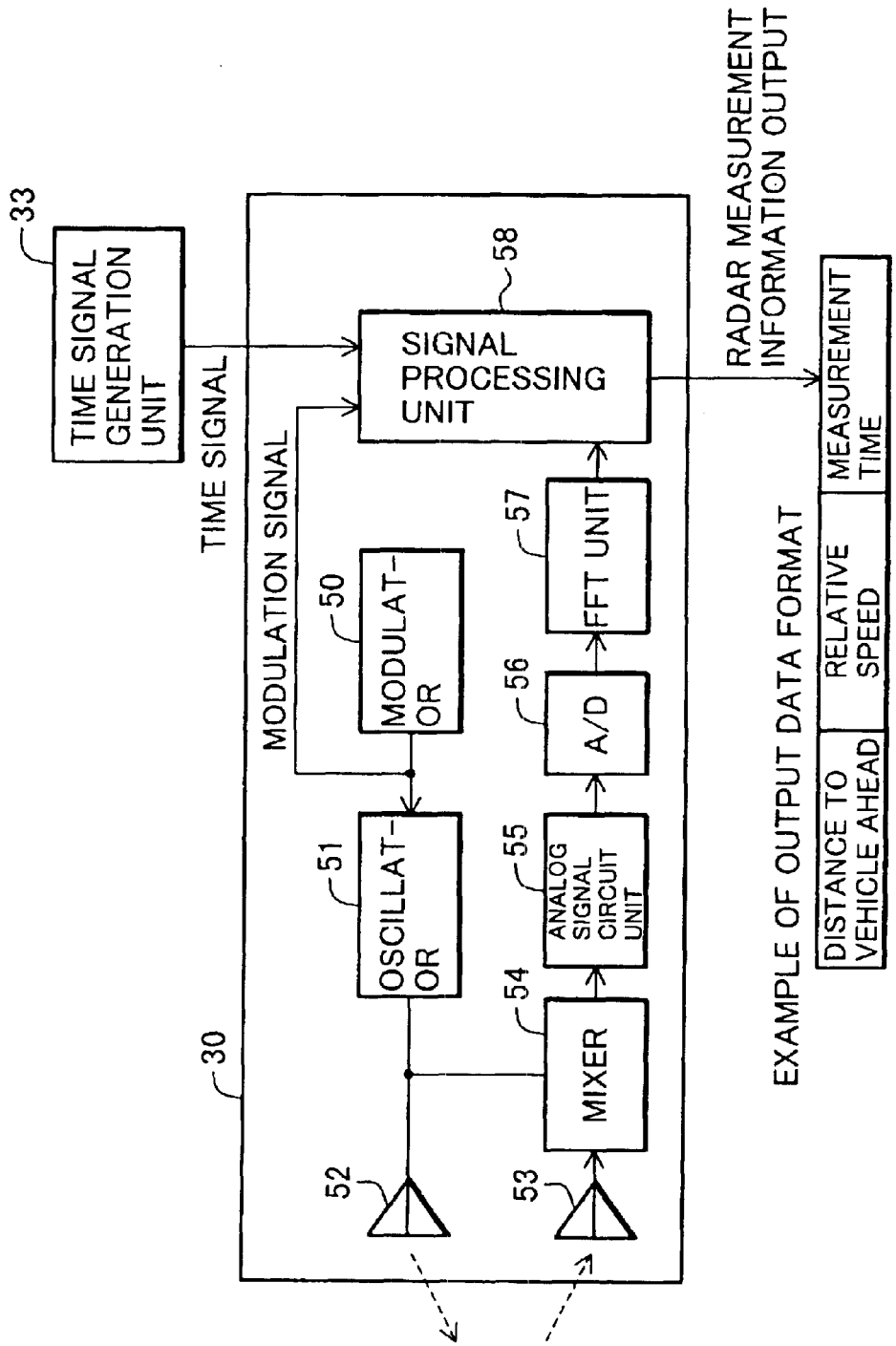
FIG. 4 is a block diagram of a radar apparatus.

FIG. 4 is a block diagram showing an example of the inner configuration of a radio wave radar which transmits radio wave and receives reflection wave thereof.

In FIG. 4, a modulator 50 sends a modulation signal for the measurement by the radar to an oscillator 51, which in turn oscillates a high frequency signal having a frequency based on the modulation signal thus sent. The high frequency signal oscillated from the oscillator 51 is sent to a transmission antenna 52 and radiated therefrom.

In a radio wave radar apparatus for a vehicle, a radio wave signal of a millimeter wave band having a function of returning a reflection wave even from a small target is usually utilized as the high frequency signal.

The receiving antenna 53 receives a radio wave signal reflected and returned from a target such as a vehicle, an obstacle etc., and the signal thus received is subject to a frequency conversion by a mixer 54. The mixer 54 is supplied with a part of the oscillation signal of the oscillator 51 through a directional coupler. A beat signal generated through the mixing operation with the signal from the oscillator 51 and the received signal from the antenna 54 is sent to an analog circuit unit 55.

Figure 5:
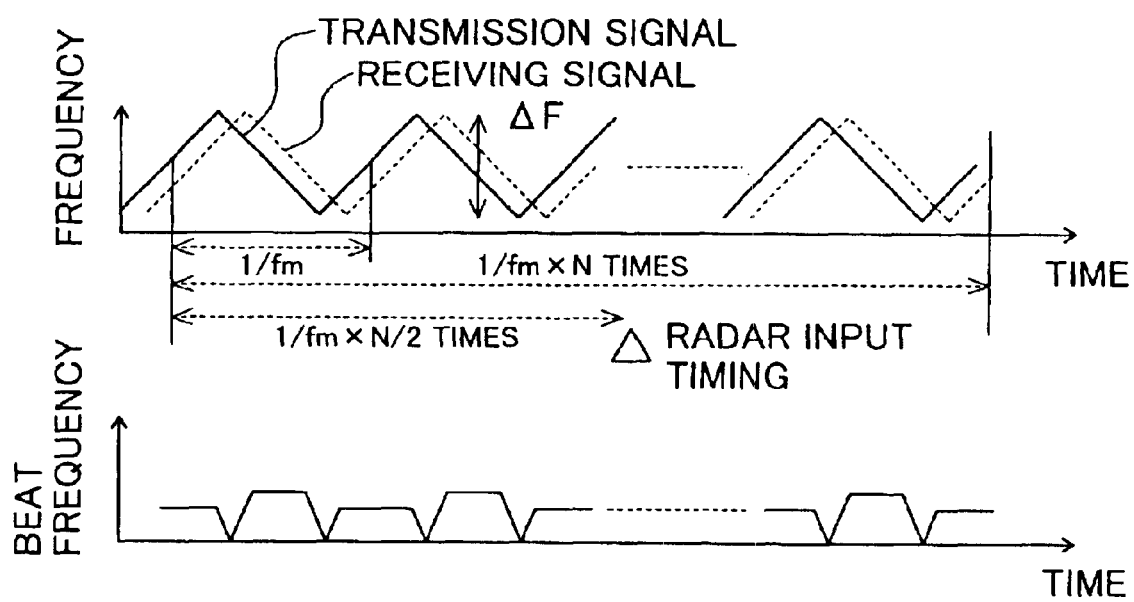
FIG. 5 is a diagram showing an example of modulation timings of the radar apparatus.

FIG. 5 shows an example of the transmission signal being modulated, the received signal and the beat signal having been mixed in the FMCW (frequency modulated continuous wave) method using the triangular-wave modulation.

In the FMCW method using the triangular-wave modulation, the frequency is deviated between the transmission signal and the receiving signal depending on a distance to a target and a relative speed with respect to the target. Thus, when the deviation is measured, the distance to the target and the relative speed with respect to the target can be obtained from the deviation.

As shown in FIG. 5, the beat signal can be obtained at each of a rising section and a falling section of the rectangular wave. The beat signal thus obtained is converted into digital data by an A/D converter 56, then subjected to frequency analysis by an FET (fast Fourier transformation) unit 57 and then a signal processing unit 58 calculates the distance and the relative speed.

The information of the distance and the relative speed calculated by the signal processing unit 58 is added with the time information representing the measuring timing obtained from the time signal sent from the time signal generation unit 33 and the modulation timing signal at the time of the radio wave transmission, and these information added with the time information is outputted to the vehicle controller 32.

FIG. 4 also shows an example of radar measurement output data of the radar apparatus 30. The radar measurement output data is configured in a format having the measurement time information in addition to the measured data such as the distance to a vehicle ahead and the relative speed etc.

To be more concrete, the measuring timing in the radio wave radar may be an intermediate point of the sampling time of the data subjected to the FFT processing. In FIG. 5, the triangular wave signal for the modulation and an example of the measuring timing are shown. The radio wave radar employs a method of continuously measuring the data for a predetermined time period in order to reduce measurement error due to the influence such as noise etc.

In the case of employing the triangular wave modulation shown in FIG. 5, when the distances of almost same values and the relative speeds of almost same values are continuously obtained for N times of the triangular wave modulation, the information of the distance and the relative speed at this time is outputted as decided information. In this case, an intermediate timing of the N times of the triangular wave modulation is used as the distance measurement timing of the radar.

Incidentally, an example of the repetition number N of the triangular wave is set to be about 10 in ordinary environment. The frequency fm of the triangular wave is set to be fm=750 Hz (1/fm=1.3 m sec.), for example. In this case, 13 m sec. is required for the samplings of N times, and the measurement timing is at a time point after 6.5 m sec. from the sampling start timing.

As described above, since the time point where the radar signal has been inputted can be accurately obtained based on the modulation signal for the radio wave radar, the vehicle control with higher accuracy can be realized by using this time information.

Next, the configuration of an example of the image pick-up apparatus 31 will be explained with reference to FIGS. 6, 7 and 8.

Figure 6:
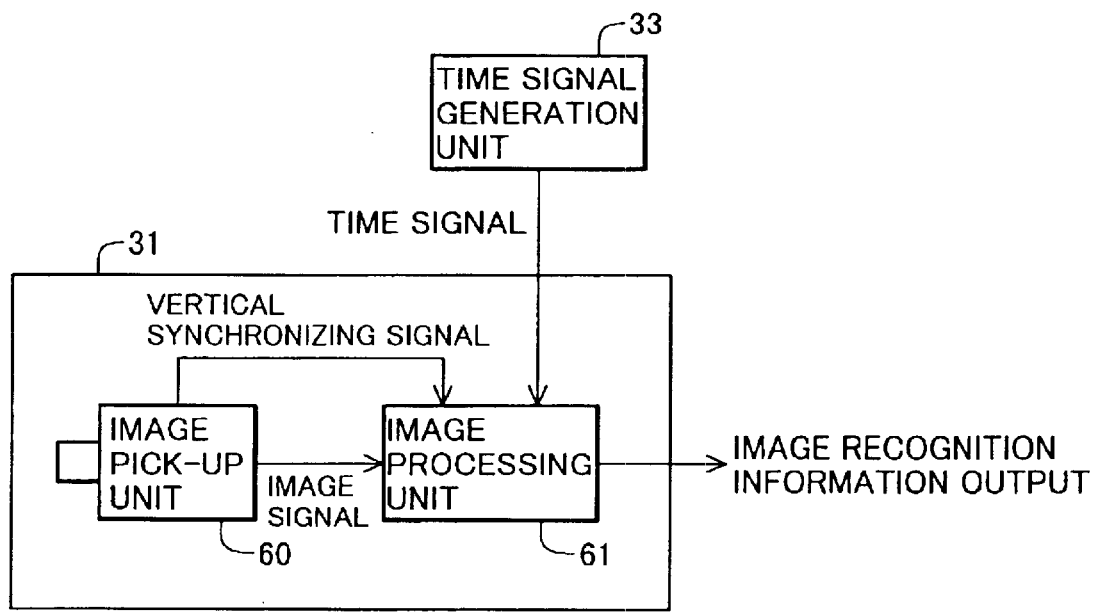
FIG. 6 is a block diagram an image pick-up apparatus.

FIG. 6 is a block diagram showing an example of the image pick-up apparatus 31 which photographs or picks up an image of a circumferential state by the camera, then subjects the photographed image to the image processing and outputs the recognition result. FIG. 7 shows an example of the vertical synchronizing signal of the image and the image input timing. FIGS. 8 and 9 show examples of images for recognizing a vehicle trying to cut In.

The image pick-up apparatus 31 shown in FIG. 6 includes an image pick-up unit 60 and an image processing unit 61. The image pick-up unit 60 photographs an image in the forward direction of the own vehicle. The image processing unit 61 processes the image thus photographed thereby to recognize a vehicle ahead, a traffic lane of the road etc.

Figure 8:
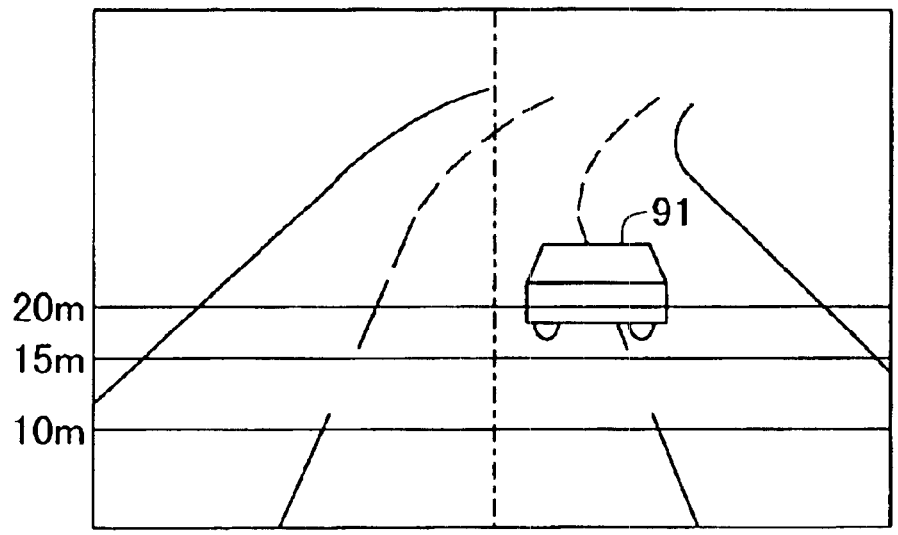
FIG. 8 is a diagram showing an example of an input image of the image pick-up apparatus.
Figure 9:
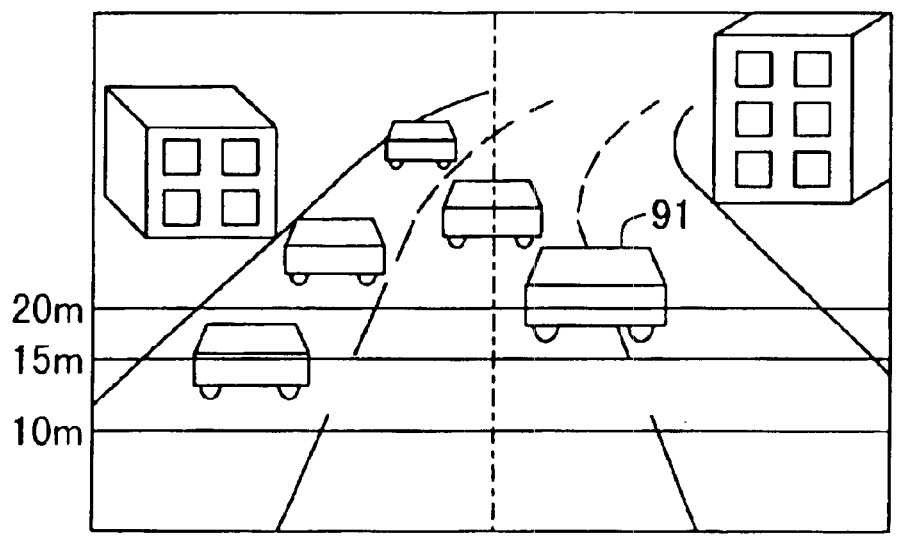
FIG. 9 is a diagram showing another example of an input image of the image pick-up apparatus.

FIGS. 8 and 9 show an example of the image in the case where a vehicle 91 trying to cut in exists at a point about 20 m ahead of the own vehicle. A CCD (charge coupled device) camera is used as the image pick-up unit 60, for example.

The CCD camera photographs images of n (for example, 30) frames per second. The image data corresponding to the respective frames is transferred to the image processing unit 61. The respective frames are outputted in synchronous with the vertical synchronizing signal of the image.

Figure 7:
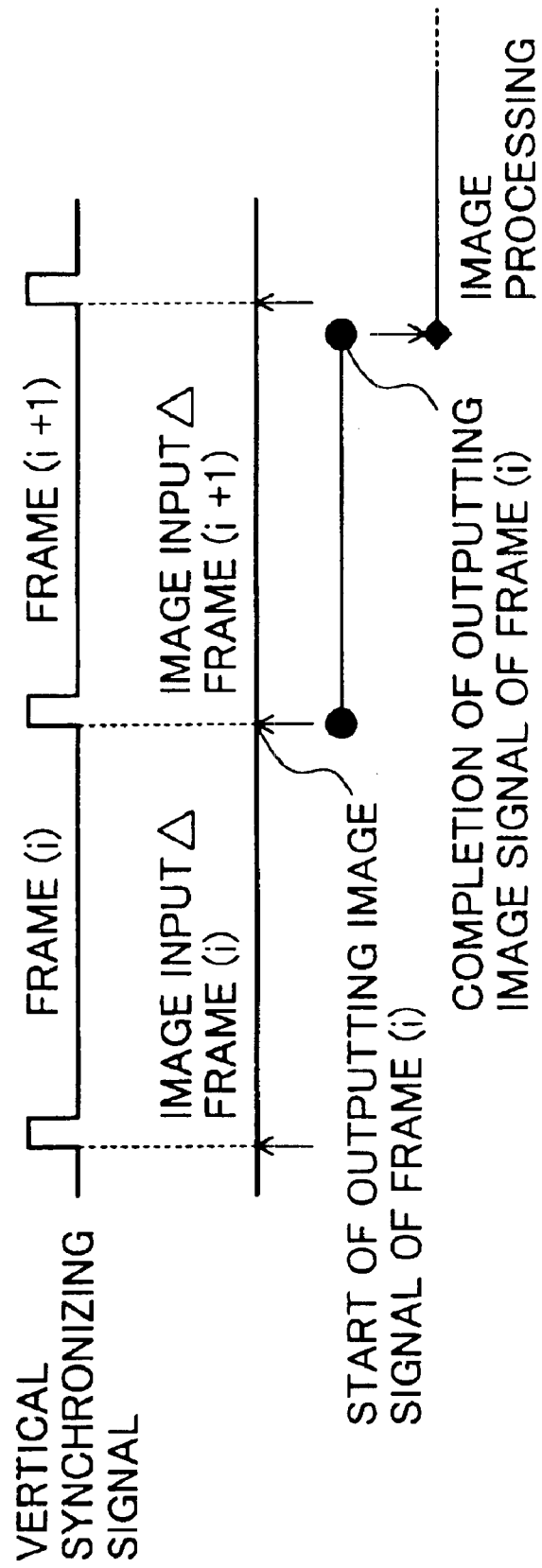
FIG. 7 is a diagram showing an example of image input timings of the image pick-up apparatus.

The output timings of the respective frames are shown in FIG. 7. That is, the image signal photographed within the time section of a frame (i) is started to be outputted in response to the vertical synchronizing signal of the next frame (i+1) serving as a trigger. After the completion of the output of the image signal of the frame (i), the image processing unit 61 executes the processing of recognizing the image photographed at the frame (i).

Like the case shown in FIGS. 2 and 3, after the completion of the image processing, the time information of the image input is sent to the vehicle controller 32 together with the image recognition information. The time information sent at this time represents the image input timing of the frame (i) where the image was photographed.

FIG. 8 shows the example where only one vehicle exists ahead of the own vehicle. In this case, a time period required for the image processing is not so long.

On the other hand, FIG. 9 shows the example where many vehicles and buildings exist ahead of the own vehicle. In this case, a time period required for the image processing becomes long. Although the time period required for the image processing differs depending on the ability of a signal processing processor, there is a case requiring several ten to several hundred m sec.

As described above, since the time point where the image has been inputted can be accurately obtained based on the timing signal of the image frame, the vehicle control with high accuracy can be realized by using this time information.

Next, an example of the flow chart of the processing performed at the sensor input data processing unit 34 will be shown in FIG. 10.

At step 100 of FIG. 10, the radar measurement information sent from the radar apparatus 30 is inputted, and at step 101, the image recognition information sent from the image pick-up apparatus 31 is inputted.

Next, at step 102, the respective input information are arranged in the order of the time sequence of the respective measurement timings of the radar apparatus 30 and the image pick-up apparatus 31 based on the respective time information accompanied to the two input information. At step 103, the radar measurement information and the image recognition information thus arranged in the order of the time sequence are outputted to the vehicle control calculation unit 35, and the process returns to step 100.

According to the flowchart shown in FIG. 10, since the vehicle control calculation unit can treat data in the order of the measured time sequence even if the plural sensors are employed, the vehicle control with higher accuracy can be realized.

Incidentally, the processing flowchart shown in FIG. 10 can be recorded on a recording medium as the control program for the measuring and controlling apparatus for a vehicle. Such a recording medium is an example of the embodiment of the present invention.

That is, the recording medium records therein the control program for the measuring and controlling apparatus for a vehicle which includes a first processing for processing the signal from the image pick-up means 1 which is mounted on the vehicle and photographs a circumferential state of the vehicle; a second processing for processing the signal from the radar measuring means 4 which radiates radio wave or light to measure a distance to a subject at the periphery of the vehicle; a time information adding processing for adding respective time information to the output information of the first processing and the output information of the second processing, respectively; a time adjusting processing for adjusting time order of the respective output information based on the time information contained in the output information of the first processing and the time information contained in the output information of the second processing; and a control processing for controlling at least one of the brake, the throttle valve and the transmission based on the output of the first processing and the output of the second processing subjected to the time adjusting processing.

Also, an automobile provided with the aforesaid measuring and controlling apparatus for a vehicle is an example of the embodiment of the present invention.

INDUSTRIAL APPLICABILITY

As explained above, according to the present invention, in the measuring and controlling apparatus for a vehicle which includes the image pick-up means which is mounted on an automobile and photographs a circumferential state of the automobile; the processing means A for processing the signal from the image pick-up means; the radar measuring means which radiates radio wave or light to measure a distance to a subject at the periphery of the automobile; the processing means B for processing the signal from the radar measuring means; and the control means for controlling at least one of the brake, the throttle valve and the transmission based on the output of the processing means A and the output of the processing means B, each of the output information of the processing means A and the output information of the processing means B includes the time information and the vehicle is controlled based on these time information.

Accordingly, the running state of the vehicle can be controlled with high accuracy while taking into consideration of the order relation of the time points where the respective information is sensed and photographed by the radar apparatus and the image processing apparatus, respectively.

Further, in the measuring and controlling apparatus for a vehicle which controls the operation of the vehicle in accordance with the information photographed by the image pick-up means, it is arranged to add the information representing the photographed time to the photographed information. Thus, even if the image processing time differs between the cases where a subject to be photographed is simple and complicated, since the photographed time can be identified, the suitable processing according to the image processing time can be executed. Thus, the running state of the vehicle can be controlled with high accuracy.

Similarly, in the measuring and controlling apparatus for a vehicle which mounts the radar measuring means thereon and controls the operation of the vehicle in accordance with the information measured by the radar measuring means, it is arranged to add the information representing the measured time to the measured information. Thus, even if the processing time differs between the cases where a subject to be measured is simple and complicated, since the measured time can be identified, the suitable processing according to the processing time can be executed. Thus the running state of the vehicle can be controlled with high accuracy.

What is claimed is:

1. A measuring and controlling apparatus for a vehicle, comprising:

an image pick-up means, which is mountable on the vehicle in order to photograph a circumferential state of the vehicle;

a first processing means for processing a signal from the image pick-up means;

a radar measuring means, which radiates radio or light waves to measure a distance to a subject at a periphery of the vehicle;

a second processing means for processing a signal from the radar measuring means; and a control means for controlling at least one of a brake, a throttle valve and a transmission based on an output of the first processing means and an output of the second processing means, wherein output information of each of the first processing means and of the second processing means includes time information.

2. A measuring and controlling apparatus for a vehicle, comprising:

an image pick-up means, which is mountable on the vehicle in order to photograph a circumferential state of the vehicle;

a first processing means for processing a signal from the image pick-up means;

a radar measuring means, which radiates radio or light waves to measure a distance to a subject at a periphery of the vehicle;

a second processing means for processing a signal from the radar measuring means;

a control means for controlling at least one of a brake, a throttle valve and a transmission based on an output of the first processing means and an output of the second processing means, wherein output information of each of the first processing means and of the second processing means includes time information; and a means for adjusting a time order of the respective output information from the time information contained in the output information of the first processing means and the time information contained in the output information of the second processing means.

3. A measuring and controlling apparatus for a vehicle, comprising:
   an image pick-up means, which is mountable on the vehicle in order to photograph a circumferential state of the vehicle;
   a first processing means for processing a signal from the image pick-up means;
   a radar measuring means, which radiates radio or light waves to measure a distance to a subject at a periphery of the vehicle;
   a second processing means for processing a signal from the radar measuring means; and
   a control means for controlling at least one of a brake, a throttle valve and a transmission based on an output of the first processing means and an output of the second processing means, wherein output information of each of the first processing means and of the second processing means includes time information;
   wherein common time information is added to the output information of the image pick-up means and the output information of the radar measuring means.

4. A measuring and controlling apparatus for a vehicle, comprising:
   an image pick-up means, which is mountable on the vehicle in order to photograph a circumferential state of the vehicle; and
   a processing means for processing a signal from the image pick-up means, wherein output information of the processing means includes time information relating to the image pick-up means.

5. A measuring and controlling apparatus for a vehicle, comprising:
   an image pick-up means, which is mountable on the vehicle in order to photograph a circumferential state of the vehicle; and
   a processing means for processing a signal from the image pick-up means, wherein output information of the processing means includes time information relating to the image pick-up means;
   wherein the time information is information relating to a time point where the image pick-up means takes an image therein.

6. A measuring and controlling apparatus for a vehicle, comprising:
   an image pick-up means, which is mountable on the vehicle in order to photograph a circumferential state of the vehicle; and
   a processing means for processing a signal from the image pick-up means, wherein output information of the processing means includes information relating to a delay time from a time point where the image pick-up means takes an image therein to a time point where the processing means outputs data.

7. A measuring and controlling apparatus for a vehicle, comprising:
   a radar measuring means, which radiates radio or light waves to measure a distance to a subject at a periphery of the vehicle; and
   a processing means for processing a signal from the radar measuring means, wherein output information of the processing means includes time information relating to the radar measuring means.

8. A measuring and controlling apparatus for a vehicle, comprising:
   a radar measuring means, which radiates radio or light waves to measure a distance to a subject at a periphery of the vehicle; and
   a processing means for processing a signal from the radar measuring means, wherein output information of the processing means includes time information relating to the radar measuring means
   wherein the time information is information relating to a time point where the radar measuring means takes receiving data therein.

9. A measuring and controlling apparatus for a vehicle, comprising:
   a radar measuring means, which radiates radio or light waves to measure a distance to a subject at a periphery of the vehicle; and
   a processing means for processing a signal from the radar measuring means, wherein output information of the processing means includes information relating to a delay time from a time point where the radar measuring means takes receiving data therein to a time point where the processing means outputs data.

10. An automobile is characterized by including a measuring and controlling apparatus for a vehicle, which comprises:
    an image pick-up means, which is mounted on the vehicle and photographs a circumferential state of the vehicle; and
    a processing means for processing a signal from the image pick-up means, wherein output information of the processing means includes time information relating to the image pick-up means.

11. An automobile is characterized by including a measuring and controlling apparatus for a vehicle, which comprises:
    an image pick-up means, which is mounted on the vehicle and photographs a circumferential state of the vehicle; and
    a processing means for processing a signal from the image pick-up means, wherein output information of the processing means includes information relating to a delay time from a time point where the image pick-up means takes an image therein to a time point where the processing means outputs data.

12. A recording medium for recording therein a control program for a measuring and controlling apparatus for a vehicle, comprising:
    a first processing for processing a signal from an image pick-up means, which is mounted on the vehicle and photographs a circumferential state of the vehicle;
    a second processing for processing a signal from a radar measuring means, which radiates radio or light waves to measure a distance to a subject at a periphery of the vehicle;
    a time information adding processing for adding respective time information to output information of the first processing and output information of the second processing, respectively;
    a time adjusting processing for adjusting time order of the respective output information based on the time information contained in the output information of the first processing and the time information contained in the output information of the second processing; and a control processing for controlling at least one of a brake, a throttle valve and a transmission based on the output of the first processing and the output of the second processing subjected to the time adjusting processing.

13. A measuring and controlling apparatus for a vehicle according to claim 2, wherein common time information is added to the output information of the image pick-up means and the output information of the radar measuring means.

14. A measuring and controlling apparatus for a vehicle according to claim 4, wherein said time information includes a time point when said image pick-up means picks up an image.

15. A measuring and controlling apparatus for a vehicle, comprising:
- a radar means, which radiates radio or light waves to measure a distance to a subject at a periphery of the vehicle; and
- a processing means for processing a signal from the radar measuring means, wherein output information of the processing means includes time information relating to the radar measuring means;
- wherein said time information includes a time point when said radar measuring means measures a group of sampling data for the processing means.

* * * * *